(12) United States Patent
Trautman

(10) Patent No.: US 11,787,053 B2
(45) Date of Patent: Oct. 17, 2023

(54) SYSTEMS AND METHODS FOR UTILIZING INTERACTING GAUSSIAN MIXTURE MODELS FOR CROWD NAVIGATION

(71) Applicant: Honda Motor Co., Ltd., Tokyo (JP)

(72) Inventor: Peter Trautman, Mountain View, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 307 days.

(21) Appl. No.: 17/065,293

(22) Filed: Oct. 7, 2020

(65) Prior Publication Data

US 2021/0146541 A1    May 20, 2021

Related U.S. Application Data

(60) Provisional application No. 62/937,334, filed on Nov. 19, 2019.

(51) Int. Cl.

| G05D 1/02 | (2020.01) |
| B25J 9/16 | (2006.01) |
| G06F 17/18 | (2006.01) |
| G06V 20/58 | (2022.01) |
| G06V 40/10 | (2022.01) |

(52) U.S. Cl.
CPC ............ *B25J 9/1666* (2013.01); *B25J 9/163* (2013.01); *G05D 1/0212* (2013.01); *G06F 17/18* (2013.01); *G06V 20/58* (2022.01); *G06V 40/103* (2022.01)

(58) Field of Classification Search
CPC ....... B25J 9/1666; B25J 9/163; G05D 1/0212; G06F 17/18; G06V 20/58; G06V 40/103; G06V 40/10
See application file for complete search history.

(56) References Cited

U.S. PATENT DOCUMENTS 11,498,587 B1* 11/2022 Mitlin .................. G05D 1/0212
11,513,533 B2* 11/2022 Kitanov ............... G05D 1/0291
(Continued)

OTHER PUBLICATIONS

T. Kruse, R. Alami, A.K. Pandey, and A. Kirsch. Human-aware robot navigation: a survey. In RAS, 2013.
(Continued)

*Primary Examiner* — Ian Jen
*Assistant Examiner* — Danielle Marie Jackson
(74) *Attorney, Agent, or Firm* — RANKIN, HILL & CLARK LLP

(57) ABSTRACT

Systems and methods for utilizing interactive Gaussian processes for crowd navigation are provided. In one embodiment, a system for a crowd navigation of a host is provided. The system includes a processor, a statistical module, and a model module. The processor receives sensor data. The statistical module identifies a number of agents in a physical environment based on the sensor data. The statistical module further calculates a set of Gaussian processes. The set of Gaussian processes includes a Gaussian Process for each agent of the number of agents. The statistical module further determines an objective function based on an intent and a flexibility. The model module generates a model of the number of agents by applying the objective function to the set of Gaussian processes. The model includes a convex configuration of the number of agents in the physical environment.

17 Claims, 5 Drawing Sheets

(56) References Cited

U.S. PATENT DOCUMENTS

| | | | |
|---|---|---|---|
| 2009/0147994 A1 | 6/2009 | Gupta et al. | |
| 2016/0023352 A1 | 1/2016 | Kennedy et al. | |
| 2016/0075026 A1* | 3/2016 | Sisbot | G05D 1/0217 700/255 |
| 2017/0190051 A1 | 7/2017 | O'Sullivan et al. | |
| 2019/0094330 A1 | 3/2019 | Adireddy et al. | |
| 2019/0349719 A1 | 11/2019 | Pattan et al. | |
| 2020/0026286 A1* | 1/2020 | Vozar | H04W 4/024 |
| 2020/0047747 A1 | 2/2020 | An et al. | |
| 2020/0089246 A1* | 3/2020 | McGill, Jr. | G05D 1/0088 |
| 2021/0276572 A1* | 9/2021 | Du | B60W 40/105 |

OTHER PUBLICATIONS

M. Kuderer, H. Kretzschmar, C. Sprunk, and W. Burgard. Feature-based prediction of trajectories for socially compliant navigation. In RSS, 2012.

C. Lam, C. Chou, K. Chiang, and L. Fu. Human centered robot navigation: Towards a harmonious human-robot coexisting environment. IEEE T-RO, vol. 27, No. 1, Feb. 2011.

S. LaValle and J. Kuffner. Randomized kinodynamic planning. IJRR, 2001.

T.B. Lee. The hype around driverless cars came crashing down in 2018. Ars Technica, 2018. URL https://arstechnica.com/cars/2018/12/uber-tesla-and-waymo-all-struggled-with-self-driving-in-2018/.

Lerner, A; Chrysanthou, Y.; and Lischinski, D. 2007. Crowds by example. In Computer graphics forum.

M. Luber, L. Spinello, J. Silva, and K.O. Arras. Socially-aware robot navigation: A learning approach. In IROS, 2012.

C.I Mavrogiannis and R. A. Knepper. Decentralized multi-agent navigation planning with braids. In WAFR, 2016.

C.I Mavrogiannis, V. Blukis, and R.A. Knepper. Socially competent navigation planning by deep learning of multi-agent path topologies. In IROS, 2017.

R. Mead, A. Atrash, and M. Matarić. Proxemic feature recognition for interactive robots: automating social science metrics. In ICSR, 2011.

E. Niedermeyer. CES was boring this year (and why that's OK). The Drive, 2019. URL http://www.thedrive.com/tech/25970/ces-was-boring-this-year-and-why-thats-ok.

Pellegrini, S.; Ess, A.; Schindler, K.; and van Gool, L. You'll never walk alone: modeling social behavior for multi-target tracking. In International Conference on Computer Vision, 2009.

C. Pérez-D'Arpino and J.A. Shah. Fast target prediction for human-robot manipulation using time series classification. In ICRA, 2015.

J. Pettre, M.Babel, J.B. Hayet, P. Salaris, and P. Salvini. From freezing to jostling robots: Current challenges and new paradigms for safe robot navigation in dense crowds. In IROS workshop, 2018.

M. Pfeiffer, G. Paolo, H. Sommer, J. Nieto, R. Siegwart, and C. Cadena. A data-driven model for interaction-aware pedestrian motion prediction in object cluttered environments. In ICRA, 2018.

C.E. Rasmussen and C.K.I. Williams. Gaussian Processes for Machine Learning. MIT Press, 2006. URL http://www.gaussianprocess.org/gpml/.

K. Rawlik, M. Toussaint, and S. Vijayakumar. On stochastic optimal control and reinforcement learning by approximate inference. In Robotics: Science and Systems, 2012.

B. Recht, R. Roelofs, L. Schmidt, and V. Shankar. Do CIFAR-10 classifiers generalize to CIFAR-10? 2018, https://arxiv.org/pdf/1806.00451.

J. Rios-Martinez, A. Spalanzani, and C. Laugier. Understanding human interaction for probabilistic autonomous navigation using risk-RRT. In IROS, Sep. 25-30, 2011.

A. Sadeghian, V. Kosaraju, A. Sadeghian, N. Hirose, H. Rezatofighi, and S. Savarese. Sophie: An attentive gan for predicting paths compliant lo social and physical constraints. In CVPR, 2019.

D. Sadigh, S.S. Sastry, S.A. Seshia, and A.D. Dragan. Planning for autonomous cars that leverage effects on human actions. In RSS, 2016.

D. Sadigh, N. Landolfi, S.S. Sastry, S.A. Seshia, and A. D. Dragan. Planning for cars that coordinate with people: Leveraging effects on human actions for planning and active information gathering over human internal state. Autonomous Robots, 2018.

A. Saumard and J.A. Wellner. Log-concavity and strong log-concavity: a review. Statistics Survey, 2014.

E. Schmerling, K. Leung, W. Vollprecht, and M. Pavone. Multimodal probabilistic model-based planning for human-robot interaction. In International Conference on Robotics and Automation, 2018.

C. Schöller, V. Aravantinos, F. Lay, and A. Knoll. The simpler the better: constant velocity prediction for pedestrian motion prediction, 2019. https://arxiv.org/pdf/1903.07933.pdf.

D. Silver, J. Schrittwieser, K. Simonyan, I. Antonoglou, A. Huang, A. Guez, T. Hubert, L. Baker, M. Lai, A. Bolton, Y. Chen, T. Lillicrap, F. Hui, L. Sifre, G van den Driessche, T. Graepel, and D. Hassabis. Mastering the game of go without human knowledge. Nature, 2017.

J. Snape, J. van den Berg, S. Guy, and D. Manocha. The hybrid reciprocal velocity obstacle. IEEE Transactions on Robotics, 2011.

L. Sturlaugson and J. W. Sheppard. Inference complexity in continuous time bayesian networks. In UAJ, 2014.

M. Svenstrup, T. Bak, and J. Andersen. Trajectory planning for robots in dynamic human environments. In IROS, Oct. 18-22, 2010.

L. Tai, J. Zhang, X. Lin, and W. Burgard. Socially compliant navigation through raw depth inputs with generative adversarial imitation learning. ICRA, 2018.

L. Takayama and C. Pantofaru. Influences on proxemic behaviors in human-robot interaction. In IROS, 2009.

Y. Teh. Dirichlet processes. In Encyclopedia of Machine Learning. Springer, 2010.

S. Thompson, T. Horiuchi, and S. Kagami. A probabilistic model of human motion and navigation intent for mobile robot path planning. In IROS, Feb. 10-12, 2009.

S. Thrun, M. Beetz, M. Bennewitz, W. Burgard, A.B. Cremers, F. Dellaert, D. Fox, D. Hähnel, C. Rosenberg, N. Roy, J. Schulte, and D. Schulz. Probabilistic algorithms and the interactive museum tour-guide robot minerva. IJRR, 2000.

P. Trautman. Robot Navigation in Dense Crowds: Statistical Models and Experimental Studies of Human Robot Cooperation. PhD thesis, California Institute of Technology, 2013.

P. Trautman. Breaking the human-robot deadlock: Surpassing shared control performance limits with sparse human-robot interaction. In Robotics: Science and Systems, 2017.

P. Trautman. Sparse Interacting Gaussian Processes: Efficiency and Optimality Theorems of Autonomous Crowd Navigation, IEEE Conference on Decision and Control, 2017, http://arxv.org/abs/1705.03639.

P. Trautman and A. Krause. Unfreezing the robot: Navigation in dense interacting crowds. In IROS, 2010.

P. Trautman, Jeremy Ma, Andreas Krause, and Richard M. Murray. Robot navigation in dense crowds: the case for cooperation. In ICRA, 2013.

P. Trautman, J. Ma, R. M. Murray, and A. Krause. Robot navigation in dense human crowds: Statistical models and experimental stdies of human robot cooperation. IJRR, 2015.

V.V. Unhelkar, C. Pérez-D'Arpino, L. Stirling, and J.A. Shah. Human-robot co-navigation using anticipatory indicators of human walking motion. In ICRA, 2015.

J. van den Berg, S.J. Guy, M. Lin, and D. Manocha. Reciprocal n-body collision avoidance. In ISRR, 2009.

A. Vemula, K. Muelling, and J. Oh. Social attention: Modeling attention in human crowds. In ICRA, 2018.

C. Zhang, S. Bengio, M. Hardt, B. Recht, and O. Vinyals. Understanding deep learning requires rethinking generalization. ICLR, 2017.

B.D. Ziebart, A.L. Maas, A.K. Dey, and J.A. Bagnell. Navigate like a cabbie: probabilistic reasoning from observed context-aware behavior. In UbiComp, 2008.

B.D. Ziebart, N.Ratliff, G. Gallagher, C. Mertz, K. Peterson, J.A. Bagnell, M. Hebert, A.K. Dey, and S. Srinivasa. Planning-based prediction for pedestrians. In IROS, 2009.

Office Action of U.S. Appl. No. 16/743,777 dated Sep. 8, 2022, 37 pages.

(56) References Cited

OTHER PUBLICATIONS

Office Action of U.S. Appl. No. 16/743,777 dated Apr. 8, 2022, 32 pages.
Office Action of U.S. Appl. No. 16/826,098 dated Apr. 1, 2022, 78 pages.
E. Adams. To survive the streets, robocars must learn to think like humans. Wired, 2017. URL https://www.wired.com/story/self-driving-cars-freezing-robot-problem/.
A. Alahi, K. Goel, V. Ramanathan, A. Robicquet, L. Fei-Fei, and S. Savarese. Social-LSTM: Human trajectory prediction in crowded spaces. In CVPR, 2016.
A. Alahi, V. Ramanathan, and L. Fei Fei. Tracking millions of humans in crowded spaces. In Group and Crowd Behavior for Computer Vision, Feb. 6, 2017.
D. Althoff, J. Kuffner, D. Wollherr, and M. Buss. Safety assessment of trajectories for navigation in dynamic environments. Autonomous Robots, Apr. 2012, vol. 32, Issue 3, pp. 285-302.
G. Aoude, B. Luders, J. How, and T. Pilutti. Sampling-based threat assessment algorithms for intersection collisions involving errant drivers. In IFAC, 2010.
M. Bagnoli and T. Bergstrom. Log-concave probability and its applications. Rationality and Equilibrium, 2004.
H. Bai, S. Cai, N. Ye, D. Hsu, and W.S. Lee. Intention-Aware Online POMDP Planning for Autonomous Driving in a Crowd. In ICRA, 2015.
T. Bandyopadhyay, K.S. Won, E. Frazzoli, D. Hsu, W.S. Lee, and D. Rus. Intention-Aware Motion Planning. In Algorithmic Foundations of Robotics X, 2013.
A. Bautin, L. Martinez-Gomez, and T. Fraichard. Inevitable collision states: A probabilistic perspective. In ICRA, 2010.
M. Bennewitz, W. Burgard, G. Cielniak, and S Thrun. Learning Motion Patterns of People for Compliant Robot Motion. IJRR, 2005.
L. Blackmore, H. Li, and B. Williams. A probabilistic approach to optimal robust path planning with obstacles. In ACC, 2006.
S. Boyd and L. Vandenberghe. Convex Optimization. Cambridge University Press, 2004.
W. Burgard, A. Cremers, D. Fox, D. Hähnel, G. Lakemeyer, D. Schulz, W. Steiner, and S. Thrun. The interactive museum tour-guide robot. In AAAI, 1998.
J. Canny and J. Reif. New lower bound techniques for robot motion planning problems. In Symposium on Foundations of Computer Science, 1987.
A. Castro-González, M. Shiomi, T. Kanda, M.A. Salichs, H. Ishiguro, and N. Hagita. Position prediction in crossing behaviors. In IROS, 2010.
S. Charara. Alexa or Google Assistant? At CES, the battle moves into home robots. Wired, 2019. URL https://www.bloomberg.com/news/articles/2018-07-24/big-tech-is-throwing-money-and-talent-at-home-robots.
C. Chen, Y. Liu, S. Kreiss, and A. Alahi. Crowd-robot interaction: Crowd-aware robot navigation with attention-based deep reinforcement learning. Technical report, 2018 https://arxiv.org/pdf/1809.08835.pdf.
Y.F. Chen, M. Everett, M. Liu, and J.P. How. Socially aware motion planning with deep reinforcement learning. In ROS, 2017.
Y.F. Chen, M. Liu, M. Everett, and J.P. How. Decentralized non-communicating multiagent collision avoidance with deep reinforcement learning. In ICRA, 2017.
Curtis, S.; Best, A.; and Manocha, D. Menge: A modular framework for simulating crowd movement. Collective Dynamics, 2016.
A. Doucet and A. Johansen. A tutorial on particle filtering and smoothing: Fifteen years later. In Oxford Handbook of Nonlinear Filtering. Oxford Handbooks, 2008.
A. Dragan and S. Srinivasa. Generating legible motion. In Robotics: Science and Systems, 2013.
A. Dragan, K. Lee, and S. Srinivasa. Legibility and predictability of robot motion. In HRI, 2013.
N. Du Toit and J. Burdick. Probabilistic collision checking with chance constraints. IEEE Transactions on Robotics, 2011.

N. Du Toit and J. Burdick. Robot motion planning in dynamic, uncertain environments. IEEE Transactions on Robotics, 2012.
A. Efrati. Waymo's big ambitions slowed by tech trouble. The Information, 2018. URL https://www.theinformation.com/articles/waymos-big-ambitions-slowed-by-tech-trouble.
M. Elbanhawi and M. Simic. Sampling-based robot motion planning: a review. IEEE Access, 2014.
M. Everett, Y.F. Chen, and J.P. How. Motion planning among dynamic, decision-making agents with deep reinforcement learning. IROS, 2018.
T. Fan, X. Cheng, J. Pan, P. Long, W. Liu, R. Yang, and D. Manocha. Getting robots unfrozen and unlost in dense pedestrian crowds. Technical report, 2018, https://arxiv.org/pdf/1810.00352.pdf.
T. Fan, P. Long, W. Liu, and J. Pan. Fully distributed multi-robot collision avoidance via deep reinforcement learning for safe and efficient navigation in complex scenarios. IJRR, 2018.
Fox, D.; Burgard, W.; and Thrun, S. The dynamic window approach to collision avoidance. IEEE RAM, 1997.
Fulgenzi, C., and et al. 2007. Dynamic obstacle avoidance in uncertain environment combining pvos and occupancy grid. In ICRA.
C. Fulgenzi, A. Spalanzani, and C. Laugier. Probabilistic motion planning among moving obstacles following typical motion patterns. In IROS, 2009.
J. Gilmer, L. Metz, F. Faghri, S.S Schoenholz, M. Raghu, M. Wattenberg, and I. Goodfellow. Adversarial spheres. ICLR, 2018.
Gloor, C. 2016. Pedsim: pedestrian crowd simulation. http://pedsim.silmaril.org/.
I.J. Goodfellow, J. Pouget-Abadie, M. Mirza, B. Xu, D. Warde-Farley, S. Ozair, A. Courville, and Y. Bengio. Generative adversarial nets. NIPS, 2014.
Agrim Gupta, Justin Johnson, Li Fei-Fei, Silvio Savarese, and Alexandre Alahi. Social GAN: Socially acceptable trajectories with generative adversarial networks. In CVPR, 2018.
M. Gurman. Big tech is throwing money and talent at home robots. Bloomberg, 2018. URL https://www.bloomberg.com/news/articles/2018-07-24/big-tech-is-throwing-money-and-tale.
E. Hall. The Hidden Dimension. Doubleday, 1966.
D. Helbing and P. Molnár. Social force model for pedestrian dynamics. Physical Review E, 1995.
P. Henry, C. Vollmer, B. Ferris, and D. Fox. Learning to navigate through crowded environments. In ICRA, 2010.
Ivanovich, B.; and Pavone, M. The trajectron: Probabilistic multi-agent trajectory modeling with dynamic spatiotemporal graphs. In ICCV, 2019.
B. Ivanovich, E. Schmerling, K. Leung, and M. Pavone. Generative modeling of multimodal multi-human behavior. In Intelligent Robots and Systems, 2018.
J. Jo and Y. Bengio. Measuring the tendency of CNNs to learn surface statistical regularities, 2017. https://arxiv.org/abs/1711.11561v1.
J. Joseph, F. Doshi-Velez, and N. Roy. A bayesian non-parametric approach to modeling mobility patterns. Autonomous Robots, 2011.
S. Karaman and E. Frazzoli. Sampling-based algorithms for optimal motion planning. In IJRR, 2011.
D.P. Kingma and M. Welling. Auto-encoding variational bayes. ICLR, 2013.
Y. Koren and J. Borenstein. Potential field methods and their inherent limitations for mobile robot navigation. In ICRA, 1991.
H. Kretzschmar, M. Spies, C. Sprunk, and W. Burgard. Socially compliant mobile robot navigation via inverse reinforcement learning. In IJRR, 2016.
A. Krizhevsky, I. Sutskever, and G.E. Hinton. ImageNet classification with deep convolutional neural networks. NIPS, 2012.
Office Action of U.S. Appl. No. 16/743,777 dated Nov. 17, 2021, 62 pages.
Office Action of U.S. Appl. No. 16/826,098 dated Aug. 31, 2022, 52 pages.
Aoude, G., et al. 2011. Probabilistically safe motion planning to avoid dynamic obstacles with uncertain motion. Autonomous Robots.

(56) References Cited

OTHER PUBLICATIONS

Notice of Allowance of U.S. Appl. No. 16/743,777 dated Dec. 8, 2022, 17 pages.
Notice of Allowance of U.S. Appl. No. 16/826,098 dated Nov. 4, 2022, 13 pages.

* cited by examiner

SYSTEMS AND METHODS FOR UTILIZING INTERACTING GAUSSIAN MIXTURE MODELS FOR CROWD NAVIGATION

CROSS-REFERENCE TO RELATED APPLICATION

This application is related to U.S. Provisional Application Ser. No. 62/937,334 filed on Nov. 19, 2019, which is expressly incorporated herein by reference. Additionally, this application is related to U.S. Provisional Application Ser. No. 62/799,481 filed on Jan. 31, 2019, which is expressly incorporated herein by reference. Furthermore, the application is related to U.S. Provisional Application Ser. No. 62/899,676 filed on Sep. 12, 2019, which is expressly incorporated herein by reference.

BACKGROUND

Classical congestion navigation algorithms may utilize deep learning and deep enforcement learning based approaches to optimize host navigation in congested environments by drawing samples for crowd and host models and then minimizing a joint cost. However, such approaches may fail to optimize intent or flexibility. In particular, such approaches may not properly handle multi-faceted intent correctly. For example, the classical congestion navigation algorithms may require a handcrafted objective function that is heuristically chosen by a human practitioner. The classical congestion navigation algorithms may alternatively require data driven representations which require the acquisition of large amounts of data. Additionally the classical congestion navigation algorithms may fail to optimize intent or flexibility, which results in failures in host-agent agreement.

BRIEF DESCRIPTION

According to one embodiment, a system for a crowd navigation of a host is provided. The system includes a processor, a statistical module, and a model module. The processor receives sensor data. The statistical module identifies a number of agents in a physical environment based on the sensor data. The statistical module further calculates a set of Gaussian processes. The set of Gaussian processes includes a Gaussian Process for each agent of the number of agents. The statistical module further determines an objective function based on an intent and a flexibility. The model module generates a model of the number of agents by applying the objective function to the set of Gaussian processes. The model includes a convex configuration of the number of agents in the physical environment.

According to another embodiment, a method for crowd navigation of a host is provided. The method includes identifying a number of agents in a physical environment based on the sensor data. The method also includes calculating a set of Gaussian processes. The set of Gaussian processes includes a Gaussian Process for each agent of the number of agents. The method further includes determining an objective function based on an intent and a flexibility. The method yet further includes generating a model of the number of agents by applying the objective function to the set of Gaussian processes. The model includes a convex configuration of the number of agents in the physical environment.

According to yet another embodiment, a non-transitory computer readable storage medium storing instructions that, when executed by a computer having a processor, cause the computer to perform a method for crowd navigation of a host. The method includes identifying a number of agents in a physical environment based on the sensor data. The method also includes calculating a set of Gaussian processes. The set of Gaussian processes includes a Gaussian Process for each agent of the number of agents. The method further includes determining an objective function based on an intent and a flexibility. The method yet further includes generating a model of the number of agents by applying the objective function to the set of Gaussian processes. The model includes a convex configuration.

DETAILED DESCRIPTION

Figure 1:
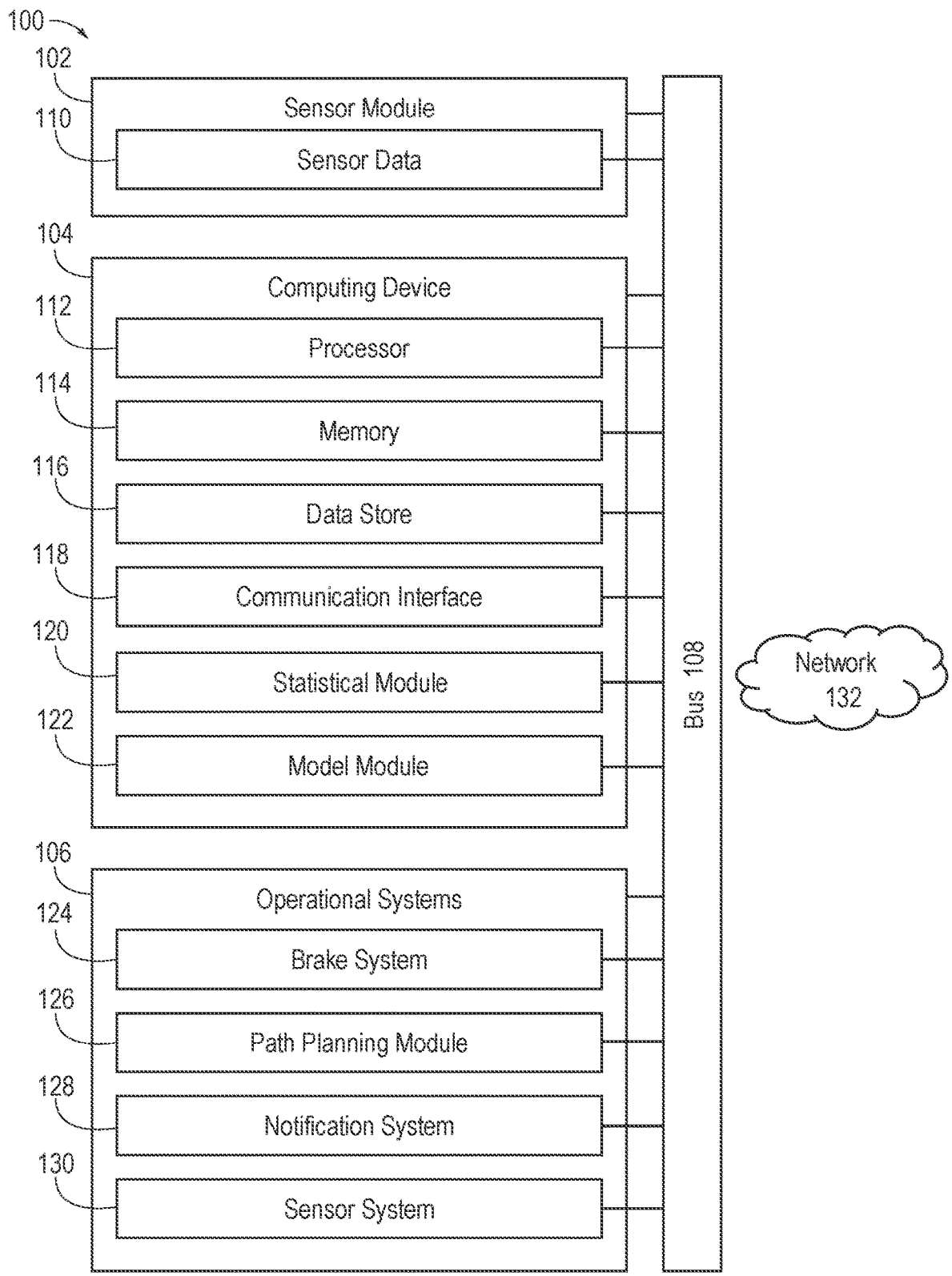
FIG. 1 is an exemplary component diagram of a system for crowd navigation, according to one aspect.

The systems and methods described herein are directed to utilizing interacting Gaussian processes for crowd navigation by addressing the exponential complexity of joint planning. A system and method for crowd navigation utilizing interacting Gaussian mixture models such as zero free-parameter Gaussian processes (zpIGP) for crowd navigation in congested environments is disclosed. The zpIGP poses congestion navigation as an optimization over crowd and host models. This more general optimization problem over models instead of samples may require analysis of joint predictive distribution $p(f^R, f|z_{1:t}^R, z_{1:t}^f)$ as will be discussed below. The system may execute a method to find the global optima of the joint arg max $f_R$ $fp(f^R, f|z_{1:t}^R, z_{1:t}^f)$ over a fixed prediction horizon.

The system may be configured to model host-agent interaction while ignoring inter-human interaction. In particular, testing reproduction of human trajectories may include removing the person under consideration from the host's observation dataset and provide the host the same start and goal position. Therefore, a joint objective function has zero support over agent models. The host-agent joint has no free parameters such that means, covariances, and mixture weights are recalculated with each measurement to prove that the cost function of interacting multi-intent, flexible agents is unique and that global optimality is achieved with select parallel convex optimizations. The host-crowd joint distribution which has exponentially many local optima may partition into a set of convex sub-problems, most of which may be discarded without sacrificing global optima. Many of the samples may be processed using an optimization routine. It may then be determined how close a host trajectory is to the human's trajectory.

For model based planning, a discount factor is hand tuned. For data driven approaches, a multitude of free parameters are hand tuned. This may cause overfitting that results generalization across applications. Additionally, model based and data driven planning may use trajectories as a basic computational unit. The current system uses zpIGP which computes over Gaussian Processes. Gaussian Processes may naturally utilize core negotiation concepts such as flexibility and intent.

Accordingly, the system utilizes statistical, optimality, and complexity principals of interacting Gaussian mixture models for the case of crowd navigation with trajectory observation data. The class of objective functions linking host and agent mixtures is limited by information constraints. The system may derive a joint obstacle avoidance function guided by these principles. The objective function may be motivated by pure statistical argumentation. The arg max of this joint obstacle avoidance function may be recovered as a non-convex optimization problem. The optimal recovery may require $O(10(\eta_t T)^3$ operations (where $\eta_t$ is the number of agents at time t and T is a prediction horizon). A heuristic is introduced that may recover near optimal trajectories while bounding $\eta_t$ for arbitrarily large crowds.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more users and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more users. Further, the term "vehicle" may include vehicles that are automated or non-automated with pre-determined paths or free-moving vehicles.

"Vehicle system," as used herein may include, but is not limited to, any automatic or manual systems that may be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

Referring now to the drawings, the drawings are for purposes of illustrating one or more exemplary embodiments and not for purposes of limiting the same. FIG. 1 is an exemplary component diagram of an operating environment 100 for utilizing interacting Gaussian mixture models for crowd navigation, according to one aspect. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments.

The computing device 104 may be implemented with a device or remotely stored. For example, with respect to a vehicle embodiment, the computing device 104 may be implemented as part of a telematics unit, a head unit, a navigation unit, an infotainment unit, an electronic control unit, among others of a host, such as the host 302 shown in FIG. 3. In other embodiments, the components and functions of the computing device 104 may be implemented, for example, with other devices 530 (e.g., a portable device) or another device connected via a network (e.g., a network 132). The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment.

The computing device 104 includes a processor 112, a memory 114, a data store 116, and a communication interface 118, which are each operably connected for computer communication via a bus 108 and/or other wired and wireless technologies. The communication interface 118 provides software and hardware to facilitate data input and output between the components of the computing device 104 and other components, networks, and data sources, which will be described herein. Additionally, the computing device 104 also includes a statistical module 120 and a model module 122, for crowd navigation facilitated by the components of the operating environment 100.

The statistical module 120 may be an artificial neural network that acts as a framework for machine learning, including deep learning. The model module 122 may be a decoder that converts the data generated by the statistical module 120 to a model, such as the model 300 of FIG. 3. The predicted labels of the model module 122 may be labels that correspond to future actions based on the sensor data 110. Continuing the vehicular example given above, the label may correspond to a predicted maneuver of the host 302. In some embodiments, the predicted maneuver may include a series of maneuvers (e.g., going-straight, right-turn, left-turn, decelerate, etc.). In some embodiments, the labels may be directed to maneuvers of the vehicle Additionally, or alternatively the labels may be learned or received from a remote server (not shown).

The computing device 104 is also operably connected for computer communication (e.g., via the bus 108 and/or the communications interface 118) to one or more operational systems 106. The operational systems 106 may include, but are not limited to, any automatic or manual systems that may be used to enhance the device, operation, and/or safety. The operational systems 106 may dependent on the implementation. For example, given a vehicular embodiment, the operational systems 106 include a brake system 124, a path planning module 126, a notification system 128, and a sensor system 130 according to an exemplary embodiment. The brake system 124 monitors, analyses, and calculates braking information and facilitates features like anti-lock brake system, a brake assist system, and an automatic brake prefill system. The path planning module 126 monitors, analyses, operates the device, such as the host 302, to some degree. For example, the path planning module 126 may store, calculate, and provide directional information and facilitates features like vectoring and obstacle avoidance among others. The notification system 128 identifies notifications, generates notifications, and facilitates communication.

The operational systems 106 also include and/or are operably connected for computer communication to the sensor system 130. The sensor system 130 provides and/or senses information associated with a device (e.g., the host 302), the operating environment 100, an environment of the device, and/or the operational systems 106. The sensor system 130 may include, but is not limited to, environmental sensors, vehicle speed sensors, accelerator pedal sensors, brake sensors, wheel sensors, among others. In some embodiments, the sensor system 130 is incorporated with the operational systems 106. For example, one or more sensors of the sensor system 130 may be incorporated with the brake system 124 monitor characteristics of the host 302, such as deceleration.

Accordingly, the sensor system 130 is operable to sense a measurement of data associated with the device, the operating environment 100, the device environment, and/or the operational systems 106 and generate a data signal indicating said measurement of data. These data signals may be converted into other data formats (e.g., numerical) and/or used by the sensor module 102, the computing device 104, and/or the operational systems 106 to generate other data metrics and parameters. It is understood that the sensors may be any type of sensor, for example, acoustic, electric, environmental, optical, imaging, light, pressure, force, thermal, temperature, proximity, among others.

The sensor module 102, the computing device 104, and/or the operational systems 106 are also operatively connected for computer communication to the network 132. The network 132 is, for example, a data network, the Internet, a wide area network (WAN) or a local area (LAN) network. The network 132 serves as a communication medium to various remote devices (e.g., databases, web servers, remote servers, application servers, intermediary servers, client machines, other portable devices). Detailed embodiments describing exemplary methods using the system and network configuration discussed above will now be discussed in detail.

II. Methods for Crowd Navigation

Figure 2:
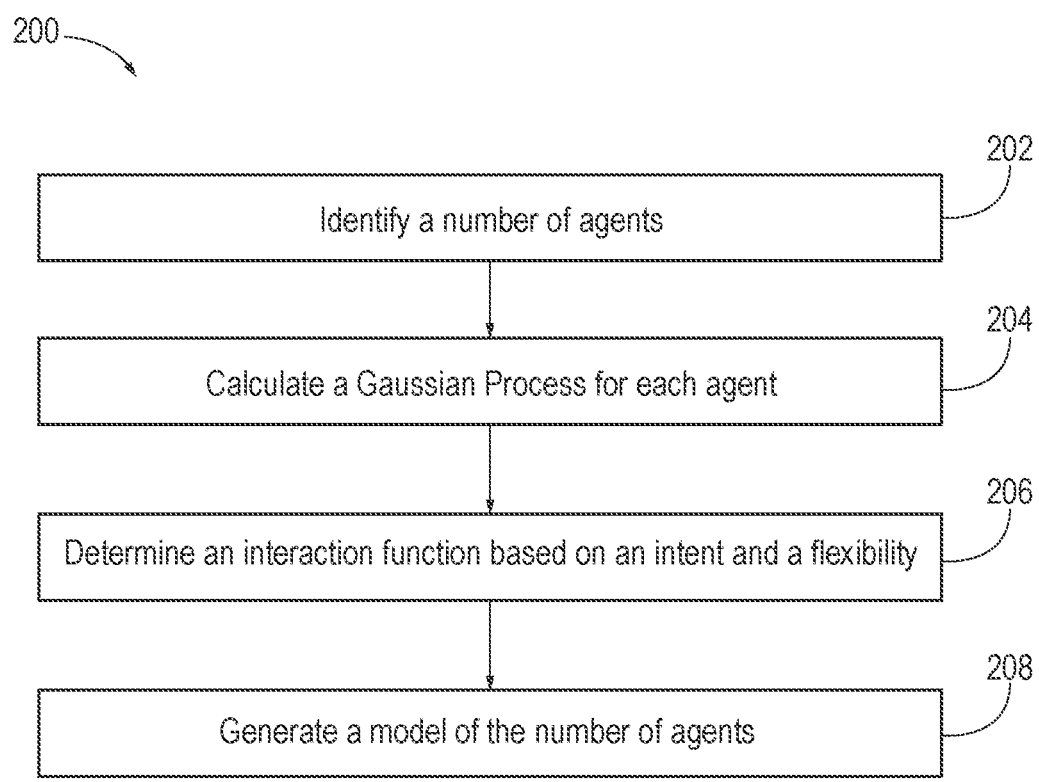
FIG. 2 is an exemplary process flow of a method for crowd navigation, according to one aspect.

Referring now to FIG. 2, a method 200 for crowd navigation will now be described according to an exemplary embodiment. FIG. 2 will also be described with reference to FIGS. 1 and 3-5.

For simplicity, the method 200 will be described as a sequence of elements, but it is understood that the elements of the method 200 may be organized into different architectures, blocks, stages, and/or processes.

Figure 3:
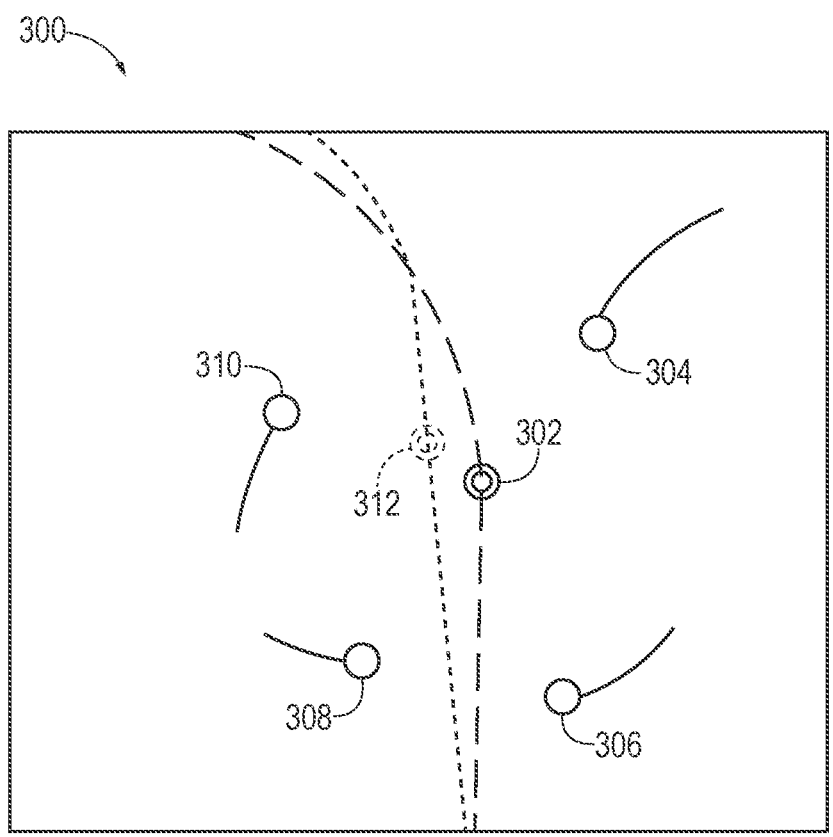
FIG. 3 is another exemplary agent environment for a system for crowd navigation, according to one aspect.

At block 202 the method 200 includes identifying a number of agents. Turning to FIG. 3, the agents 304-312 are entities moving in a physical environment, represented in the model 300, of the host 302. The agents 304-312 may be humans, vehicles, robots, etc. The agents 304-312 may be identified based on sensor data 110 including, visual data, motion data, and physiological data, among others. In this manner, the statistical module 120 may detect or identify one or more of the entities, objects, obstacles, hazards, and/or corresponding attributes or characteristics. For example, the agent data may include an agent identification, speeds of the agents 304-312, distances of the agents 304-312 from the host 302, a bearing or direction of travel of the agents 304-312, size of the agents 304-312, a position or a location associated with the agents 304-312, such as a lane location, coordinates, etc.

In one or more embodiments, the statistical module 120 may identify white lines and hard shoulders of a roadway or road segment to facilitate lane recognition. In another embodiment, the statistical module 120 may identify infrastructure of the physical environment. Further, the statistical module 120 may identify or classify an agent of the agents 304-312 as different types of agents, for example, a pedestrian, vehicle, a cyclist, etc. The different types may be based on the speed at which the agent moves, the size of the agent, and/or other sensor data 110.

The sensor module 102 receives sensor data 110. The sensor data 110 may be received from the sensor system 130, remote devices (e.g., via the bus 108 and/or the communications interface 118), and/or a biological entity. The sensor data 110 may include a video sequence or a series of images, user inputs, and/or data from the operational systems 106, such as data from a Controller Area Network (CAN) bus including as pedal pressure, steer angle, etc. The sensor system 130 may include one or more radar units, image capture components, sensors, cameras, gyroscopes, accelerometers, scanners (e.g., 2-D scanners or 3-D scanners), or other measurement components. In some embodiments, the sensor data 110 is augmented as additional sensor data from other sources is received. For example, the data from the CAN bus may be augmented by information the agents 304-312, the types of agent, and image/video data, among others.

At block 204 the method 200 includes calculating a Gaussian Process for each agent of the agents 304-312 and the host 302. A Gaussian Process is a stochastic process (i.e., a collection of random variables indexed by time or space), such that every finite collection of those random variables has a multivariate normal distribution, i.e. every finite linear combination of them is normally distributed. Here the Gaussian Processes may be defined as $\chi$ to be the state of the agents 304-312 and the host 302. For example, $\chi$ could be $\mathbb{R}^2$ for planar navigation. The measurements $z_{1:t}^R$ of the trajectory of the host 302 $f^R$: $t \in \mathbb{R} \to \chi$ and $n_t$ measurements $z_{1:t}^1, \ldots, z_{1:t}^{n_t}$ of the human trajectories $f=[f^1, f^{n_t}]$: $t \in \mathbb{R} \to \chi$, where f represents the crowd. The functions $f^R$ and f may be governed by $p(f^R|z_{1:t}^R)$ and $p(f^i|z_{1:t}^i)$ for each i. Herein, the shorthand $z_{1:t}^f = [z_{1:t}^{f^1}, \ldots, z_{1:t}^{f^i}, \ldots, z_{1:t}^{f^{n_t}}]$ may be used. Further, $f^R$, $f^i \in \mathcal{F}(\chi)$, the function space over $\chi$ and the shorthand $\mathcal{N}(x|\mu,\Sigma) \equiv GP(x|\mu,\Sigma)$ may be used by the statistical module 120 to define the Gaussian processes of the agents 304-312 and the host 302 as:

$$p(f^i|z_{1:t}^{f^i}) = \Sigma_{k_i=1}^{N_t^{f^i}} w_{k_i}^{f^i} \mathcal{N}(f^i|\mu_{k_i}^{f^i}, \Sigma_{k_i}^{f^i}) \text{ for each of the agents 304-312, and}$$

$$p(f^R|z_{1:t}^R) = \Sigma_{\ell=1}^{N_t^R} w_\ell^R \mathcal{N}(f^R|\mu_\ell^R, \Sigma_\ell^R) \text{ for the host 302.} \quad \text{(Eq. 01)}$$

Furthermore, as the statistical module 120 may continually calculate the Gaussian processes as sensor data 110 is received. For clarity, time is expressed as: $w_\ell^R \equiv w_\ell^R(t), \ldots,$ $$w_{k_{n_t}}^{f^{n_t}} \equiv w_{k_{n_t}}^{f^{n_t}}(t) \text{ and } \mu \equiv \mu(t), \Sigma \equiv \Sigma(t).$$

In this manner, the Gaussian processes may be defined as follows:

Definition 1: Let $\mathcal{N}_{f^R,\ell} = \mathcal{N}(f_R|\mu_\ell^R, \Sigma_\ell^R)$. For each $f^i$, let $\mathcal{N}_{f^i,p} = \mathcal{N}(f^i|\mu_v^p, \Sigma_v^p)$ where $v=k_i$ and $p \in \{1, \ldots, n_t\}$. For example $p(f^R|z_{1:t}^R) = \Sigma_{\ell=1}^{N_t^R} w_\ell^R \mathcal{N}_{f^R,\ell}$.

Definition 2: The intents of the agents 304-312 and the host 302 are given by $\mu_{k_i}^{f^i}$, $\mu_\ell^R$ respectively. If $N_t^{f^i}$ or $N_t^R$ is greater than 1, intent ambiguity is present. Intent preferences are $w_k^{f^i}$ and $w_\ell^R$.

Definition 3: Flexibility is the willingness of the agents 304-312 to compromise their intent. Mathematically, the flexibility of intent $\mu$ is $\Sigma$.

In Equation 0.1, intent preferences are the data likelihood, e.g. $w_\ell^R = \mathcal{N}(f^R = z_{1:t}^R|\mu_\ell^R, \Sigma_\ell)$. To generate the Gaussian processes the data $z_{1:t}^R$, $z_{1:t}^f$ is used. Let $p(f^i|z_{1:t}^i) = \Sigma_{k_i=L,R} w_{k_i}^{f^i} \mathcal{N}_{f^i,k_i}$. Because $N_t^{f^i} = 2$, intent ambiguity is present over left and right intents. Flexibility is motivated by the following. Draw an agent sample x and evaluate according to $\mathcal{N}(f^i = x|\mu,\Sigma)$. For large covariance, large deviation from intent returns nontrivial probabilities (e.g., large flexibility); for small covariance, large deviation from intent returns vanishing probability.

In this manner, the crowd navigation uses a joint host-crowd density $p(f^R, f|z_{1:t}^R, z_{1:t}^f)$ to generate the action $u_t = f_{t+1}^{R*}$ at time t according to:

$$[f^R, \ldots, f^{n_t}]^* = \text{argmax } p(f^R, f^R, \ldots, f^{n_t}|z_{1:t}^R, z_{1:t}^f) \quad \text{(Eq. 0.2)}$$

At block 206 of the method 200, an objective function is determined based on the intent and flexibility. For example, suppose the intent of the host 302 is to avoid a collision with the agent 312 while also continuing to move in as direct a path as possible. In this manner, the intent may be a balance between competing goals. The flexibility is the degree to which the host 302 may deviate from the intent. In this manner, the Gaussian processes define the intent and flexibility for the host 302 and the agents 304-312 as the mean and variance, respectively, of the function $\psi$.

Starting with the Gaussian processes, a set of principles is derived that the objective function conforms to. The objective function couples the agent models. Accordingly, the objective function is determined based on desired safety and efficiency properties and an optimization routine to find $u_t = f_{t+1}^{R*}$.

$$p(f^R, f|z_{1:t}^R, z_{1:t}^f) = \psi(f^R, f, \gamma) p(f|z_{1:t}^f) p(f^R|z_{1:t}^R) = \quad \text{(Eq. 0.3)}$$
$$\prod_{i=1}^{n_t} \psi(f^R, f^i, \gamma) p(f^i|z_{1:t}^{f^i}) p(f^R|z_{1:t}^R)$$

The function $\psi(f^R, f, \gamma)$, $\gamma \in \mathbb{R}$ is a product of pairwise objective functions $\psi(f^R, f^i, \gamma)$ modulated by $p(f|z_{1:t}^f)$. This model captures host-agent interaction but ignores inter human interaction. For simplicity, suppose the two-agent case ($n_t = 1, 1$ host) is given with statistically valid forms of $\psi(f^R, f^i, \gamma)$. Since $p(f^R|z_{1:t}^R)$, $p(f^i|z_{1:t}^{f^i})$ encode online intention and flexibility information (Equation 0.1, Definitions 2, 3), the means and covariance capture inter-agent intention and flexibility that is specific to and influenced by agent interaction. If the objective function has finite support $$\left(\text{e.g., } \psi(f^R, f^i, \gamma) = \prod_{t=1}^T \left[1 - \exp\left(-\frac{1}{2\gamma}(f_t^R - f_t)\right)\right] \text{ where } \gamma > 0\right),$$

joint flexibility is altered in a static and generic way any interaction probability mass encoded in $\psi(f^R, f^i, \gamma)$ alters the agent-specific flexibilities. For example, the host 302 and the agent 312 are flexible with each other in a specific way, which is already captured in $p(f^i|z_{1:t}^{f^i}), p(f^R|z_{1:t}^R))$. In one embodiment, the statistics of $p(f^R|z_{1:t}^R)$ and $p(f^i|z_{1:t}^{f^i})$ a transform $\bar{\delta}(f^R, f)$ is introduced, where $\bar{\delta}(f^R, f) = 1$ if samples of $f^R$, $f^i$ are not equal at any time t and $\bar{\delta}(f^R, f) = 0$ otherwise.

To preserve the statistics of $p(f^R|z_{1:t}^R), p(f|z_{1:t}^f)$, the following transform, where $f_\ell^R \sim p(f^R|z_{1:t}^R)$, $f_k^i \sim p(f^i|z_{1:t}^{f^i})$ is given.

Definition 4 ($\bar{\delta}(f^R, f)$ transform). Let $$\bar{\delta}(f_\ell^R, f_k^i) \equiv \lim_{\gamma \to 0}\left[\prod_{\tau=1}^T \left(1 - \exp\left[-\frac{1}{2\gamma}(f_\ell^R(\tau) - f_k^i(\tau))^2\right]\right)\right] = \quad \text{(Eq. 0.4)}$$

-continued $$\begin{cases} 1 \text{ if } \nexists t \in [1, T] \text{ such that } f_l^R(t) = f_k^i(t) \\ 0 \text{ if } \exists t \in [1, T] \text{ such that } f_\ell^R(t) = f_k^i(t) \end{cases},$$

Ultimate any finite support $\psi(f^R, f^i, \gamma)$ alters agent flexibility. Furthermore, $c_{k_i,\ell} = c(\mu_\ell^R, \mu_{k_i}^f, \Sigma_\ell^R, \Sigma_{k_i}^f)$ a function of the GP means and covariances. Let $\psi(f^R, f^i, \gamma) = c_{k_i,\ell}$; then using Equation 0.1 and 0.3

$$p(f^R, f^i | z_{1:t}) = \sum_{\ell=1}^{N_t^R} \sum_{k=1}^{N_t^{f^i}} c_{k_i,\ell} w_\ell^R w_{k_i}^{f^i} \mathcal{N}_{f^R,\ell} \mathcal{N}_{f^i,k_i}.$$

Although the joint undergoes distortion from the effect of $c_{k_i,\ell}$ on the component weights $w_\ell^R w_{k_i}^{f^i}$, no individual $\Sigma_\ell^R$ or $\Sigma_{k_i}^f$ in component $\mathcal{N}_{f^R,l} \mathcal{N}_{f^i,k_i}$ is altered. Thus, the flexibility of $p(f^R|z_{1:t}^R) p(f^i|z_{1:t}^{f^i})$ is preserved under any $c_{k_i,\ell}$ transform. Finally, let $(f^R, f^i, \gamma) = \bar\delta(f^R, f^i)$. Let $f_a^i \sim p(f^i | z_{1:t}^{f^i})$, $f_b^R \sim p(f^R | z_{1:t}^R)$, $\eta_a^f = p(f^i = f_a^i | z_{1:t}^f)$, and $\eta_b^R = p(f^R = f_b^R | z_{1:t}^R)$. Then, for all $b, p(f_b^R, f_a^i | z_{1:t}) = \bar\delta(f_b^R, f_a^i) \eta_b^R \eta_a^f$. If $\nexists t \in [1,T]$ such that $f_b^R(t) = f_a^i(t)$, then $\bar\delta(f_b^R, f_a^i) \eta_b^R \eta_a^f = \eta_b^R \eta_a^f$; otherwise, it is zero. Thus, $\bar\delta(f^R, f^i)$ respects the agent flexibility data contained in $(f^i | z_{1:t}^R)$. The same argument may be made for $(f^i | z_{1:t}^f)$; thus, $\bar\delta(f^R, f^i)$ respects the flexibility data in $p(f^R|z_{1:t}^R)$ and $p(f^i|z_{1:t}^f)$. If a trajectory basis is used such that $p(f^R, f_i | z_{1:t}) = \Sigma_g^G w_g \delta([f^R, f^i] - [f^R, f^i]_g$ then $\bar\delta(f^R, f)$ would be applicable: discard intersecting samples. Since the interaction of two GPs is probabilistic, a "coupling" probability is appropriate.

At block 208 the method 200 includes the model module 122 generating a model for the agents the 304-312 relative to the host. The model is generated by applying the objective function to the set of Gaussian processes. First order interacting GP facilitate modeling agent interactions such as collisions. For Gaussian Processes, the probability of host-agent collision does not only involve time-aligned terms:

$z_{\ell,k_i,t}^{-1} = \int \mathcal{N}(x | \mu_{\ell,t}^R, \sigma_{R,\ell}^{t,t}) \mathcal{N}(x | \mu_{k_i,\tau}^f, \sigma_{f,k_i}^{t,\tau})$ where $\mu_{\ell,t}^R = \mu_\ell^R(t)$, $\mu_{k_i}^f = \mu_{k_i}^f(t) \in \mathbb{R}^2$ and $\sigma^{t,t}$ is the $t^{th}$ diagonal of $\Sigma$. Since $\Sigma_l^R$, $\Sigma_{k_i}^f$ are dense, positions are correlated via covariance off diagonals and $\int \mathcal{N}(x | \mu_{\ell,t}^R, \sigma_{R,\ell}^{t,\tau}) \mathcal{N}(x | \mu_{k_i,\tau}^f, \sigma_{f,k_i}^{t,\tau}) = w_{\ell,k_i,t} \exp[-\frac{1}{2}(\mu_{\ell,t}^R - \mu_{k_i,\tau}^f)^T (\sigma_{l+k_i}^{t,\tau} \mathbb{I})^{-1} (\mu_{\ell,t}^R - \mu_{k_i,\tau}^f)] \equiv w_{\ell,k_i,t} Z_{\ell,k_i,t,\tau}^{-1}$, contributes to collision probability ($\sigma_{l+k_i}^{t,t}$) is the $(t, \tau)$'th element of $\Sigma_{\ell+k_i} = \Sigma_\ell^R + \Sigma_{k_i}^f$, $w_{\ell,k_i,t} = (2\pi \sigma_{l+k_i}^{t,\tau})^{-1/2}$). Since $z_{\ell,k_i,t}^{-1}$ is the coupling between $f_t^R$ and $f_\tau^i$, the value $\Pi_{\tau=1}^T (1 - Z_{\ell,k_i,t,\tau}^{-1})$ is the decoupling between the host 302 at t and the trajectory of agent i, such as one or more of agents 304-310.

Definition 5. The symbol $\mathbb{P}(\neg \kappa)$—the probability of not colliding—represents the decoupling of $\mathcal{N}_{f^R,\ell}$ and $\mathcal{N}_{f,k_i}$ by $$\mathbb{P}(\neg \kappa) = \prod_{t=1}^T \prod_{\tau=1}^T (1 - Z_{\ell,k_i,t,\tau}^{-1}) \quad \text{(Eq. 0.6)}$$

Definition 6. The transform $P\neg K$ measures how decoupled the host and agent GPs $\mathcal{N}_{f^R,\ell}$ and $\mathcal{N}_{f,k_i}$ are:

$$P_{\neg \kappa} : \mathcal{N}_{f^R,\ell} \mathcal{N}_{f^i,k_i} \to \Pi_{t=1}^T \Pi_{\tau=1}^T (1 - Z_{\ell,k_i,t,\tau}^{-1}) \mathcal{N}_{f^R,\ell} \mathcal{N}_{f^i,k_i} = \Lambda_{\ell,k_i} \mathcal{N}_{f^R,\ell} \mathcal{N}_{f^i,k_i},$$

where $\Lambda_{\ell,k_i} = \Pi_{t=1}^T \Pi_{\tau=1}^T (1 - Z_{\ell,k_i,t,\tau}^{-1})$.

The quantity $\Lambda_{\ell,k_i}$ is close to 1 when $\mathcal{N}_{f^R,\ell}$ is decoupled from $\mathcal{N}_{f,k_i}$ and near zero when $\mathcal{N}_{f^R,\ell}$ is coupled to $\mathcal{N}_{f,k_i}$. Since $\Lambda_{\ell,k_i}$ changes based on $\mu_\ell^R$ and $\mu_{k_i}^f$ it is a natural cooperative collision avoidance metric.

Agent models are often defined as $f_t^i = h(f_{t-1}^i, \eta_t)$, $\eta_t \cdot \mathcal{N}(0, \alpha_{\eta_t})$. This induces a diagonal trajectory covariance matrix: agent flexibility at t is decoupled from flexibility at t+1. Accordingly, the objective function is applied to the set of Gaussian processes for the host 302 and the agents 304-312. The objective function may be applied to a Gaussian process by:

$$p(f^R, f^i | z_{1:t}) = P_{\neg \kappa} \left[ \sum_{\ell=1}^{N_t^R} w_\ell^R \mathcal{N}_{f^R,\ell} \sum_{k=1}^{N_t^{f^i}} w_{k_i}^{f^i} \mathcal{N}_{f^i,k_i} \right] = \quad \text{(Eq. 0.7)}$$

$$\sum_{\ell=1}^{N_t^R} \sum_{k_i=1}^{N_t^{f^i}} \Lambda_{l,k_i} w_\ell^R w_{k_i}^{f^i} \mathcal{N}_{f^R,\ell} \mathcal{N}_{f^i,k_i}$$

Eq. 0.7 may be generalize IGP to $n_t \geq 1$, such that for a multi-agent interacting Gaussian process may be given by $$p(f^R, f^i | z_{1:t}) = P_{\neg \kappa}^{IGP} \left[ \sum_{\ell=1}^{N_t^R} w_\ell^R \mathcal{N}_{f^R,\ell} \prod_{i=1}^{n_t} \sum_{k=1}^{N_t^{f^i}} w_{k_i}^{f^i} \mathcal{N}_{f^i,k_i} \right] \quad \text{(Eq. 0.8)}$$

$$= P_{\neg \kappa}^{IGP} \left[ \sum_{\ell=1}^{N_t^R} w_\ell^R \mathcal{N}_{f^R,\ell} \times \sum_{k_i=1}^{N_t^{f^1}} w_{k_1}^{f^1} \mathcal{N}_{f^1,k_1} \times \ldots \times \right.$$

$$\left. \sum_{k_{n_t}=1}^{N_t^{f^{n_t}}} w_{k_{n_t}}^{f^{n_t}} \mathcal{N}_{f^{n_t},k_{n_t}} \right]$$

$$= \sum_{\eta=1}^{N_{BIG}} [\Lambda w]_\eta [\mathcal{N}_{f^R} \mathcal{N}_{f^1} \ldots \mathcal{N}_{f^{n_t}}]_\eta$$

where $N_{BIG} = N_t^R \prod_{i=1}^{n_t} N_t^{f^i}$ and $\eta$ enumerates all products of host and agent Gaussian processes. The coefficients $[\Lambda w]_\eta = \Lambda_\eta^{R,f^1} \ldots \Lambda_\eta^{R,f^{n_t}} w_\eta^R w_\eta^{f^1} \ldots w_\eta^{f^{n_t}}$ weight each Gaussian process basis element $[\mathcal{N}_{f^R} \mathcal{N}_{f^1} \ldots \mathcal{N}_{f^{n_t}}]_\eta = \mathcal{N}_{f^R,\eta} \mathcal{N}_{f^1,\eta} \ldots \mathcal{N}_{f^{n_t},\eta}$ according to p. The operator $P_{\neg \kappa}^{IGP}$ operates pairwise $P_{\neg \kappa}^{IGP} \equiv (P_{\neg \kappa}^{IGP})^{n_t} = P_{\neg \kappa} \circ P_{\neg \kappa} \circ \ldots \circ P_{\neg \kappa}$ such that the agents 304-312 may be measured with respect to the host 302.

Instead of brute force enumeration, the $N^* \ll N_{BIG}$ modes are determined that capture Equation 0.8, in a process called optimal shaping such that a convex configuration of the number of agent in the physical environment is determined. Accordingly, the modes with the most likely probability are determined.

Firstly, $\mu_t^R$, $\mu_{k_i}^f$ are treated as functions $x_{R,\ell}$, $x_{f,k_i} \in \mathcal{F}(\mathbb{R}) \to \mathbb{R}^2$ mapping time to (x,y) position and search for the $x_{R,\ell}^*$, $x_{f,k_i}^*$ that optimize $[\Lambda w]_\eta$ such that:

$$w_{x_{R,\ell}} = \mathcal{N}\left(x_{R,\ell} \mid \mu_\ell^R, \Sigma_\ell^R\right)$$

$$w_{x_{f^i,k_i}} = \mathcal{N}\left(x_{f^i,k_i} \mid \mu_{k_i}^{f^i}, \Sigma_{k_i}^{f^i}\right)$$

$$Z^{-1}_{x_{R,\ell,t}, x_{f^i,k_i,\tau}} =$$

$$\exp\left[-\frac{1}{2}\left(x_{R,\ell,t} - x_{f^i,k_i,\tau}\right)^T (\sigma_{\ell+k_i}^{t,\tau} \Pi)^{-1} \left(x_{R,\ell,t} - x_{f^\tau,k_i,\tau}\right)\right] \text{ where}$$

$$x_{R,\ell,t} = x_{R,\ell}(t), \; x_{f^i,k_i,\tau} = x_{f^i,k_i}(\tau) \in \mathbb{R}^2.$$

If $x_f = [x_{f^i,k_1}, x_{f^t,k_{n_t}}]$, then an objective function of the interacting function may be given by $$\lambda_{n_t}(x_{R,\ell}, x_f) \equiv w_{x_{R,\ell}} \Pi_{i=1}^{n_t} \Pi_{t=1}^T \Pi_{\tau=1}^T (1 - Z^{-1}_{x_{R,\ell,t}, x_{f^i,k_i,\tau}}) w_{x_{f^i,k_i}}$$

A logarithm may be used to reduce the optimization computational burden and increase numerical accuracy such that:

$$\log \lambda_{n_t}(x_{R,\ell}, x_f) = \sum_{i=1}^{n_t} \sum_{t=1}^T \sum_{\tau=1}^T \log\left(1 - Z^{-1}_{x_{R,\ell,t}, x_{f^i,k_i,\tau}}\right) - \quad \text{(Eq. 0.9)}$$

$$\frac{1}{2}(x_{R,\ell} - \mu_\ell^R)^T (\Sigma^R)^{-1} (x_{R,\ell} - \mu_\ell^R) -$$

$$\sum_{i=1}^{n_t} \frac{1}{2}\left(x_{f^i,k_i} - \mu_{k_i}^{f^i}\right)^T (\Sigma^{f^i})^{-1} \left(x_{f^i,k_2} - \mu_{k_i}^{f^i}\right)$$

So that the convex configuration of the agents 304-312 in the physical environment is $$[x_{R,\ell}^*, x_f^*] = \arg\max \log [\lambda_{n_t}(x_{R,\ell}, x_f)] \quad \text{(Eq. 0.10)}$$

The objective function defines the intent. Returning to the example given above, suppose the intent of the host 302 is to avoid a collision with the agent 312 while also continuing to move in as direct a path as possible. Avoiding a collision and encouraging cooperation may be given by:

$$\alpha_{n_t}(x_{R,\ell}, x_f) = \sum_{i=1}^{n_t} \prod_{t=1}^T \prod_{\tau=1}^T \log\left(1 - Z^{-1}_{x_{R,\ell,t}, x_{f^i,k_i,\tau}}\right)$$

while continuing to move in as direct a path, such as a straight line may be given by:

$$\beta_{n_t}(x_{R,\ell}, x_f) = -\frac{1}{2}(x_{R,\ell} - \mu_\ell^R)^T (\Sigma_\ell^R)^{-1}$$
$$(x_{R,\ell} - \mu_\ell^R) - \frac{1}{2} \Sigma_{i=1}^{n_t} (x_{f^j,k_i^{n_t}} - \mu_{k_i}^j)^T (\Sigma_{k_i}^j)^{-1} (x_{f^j,k_i} - \mu_{k_i}^j).$$

Accordingly, while $\alpha_{n_t}(x_{R,\ell}, x_f)$ encourages a cooperative protocol and prevents collisions, $\beta_{n_t}(x_{R,\ell}, x_f)$ penalizes actions that deviate from agent intent. Unless the optimal values for $\beta_{n_t}(x_{R,\ell}, x_f)$ already optimize $\lambda_{n_t}(x_{R,\ell}, x_f)$, $\alpha_{n_t}(x_{R,\ell}, x_f)$ moves $x_{R,\ell}, x_f$ away from intent.

To generate the convex configuration, the optimizations are seeded with $(\mu^R, \mu^f) \pm (0, [\sigma^R, \sigma^f], 2[\sigma^R, \sigma^f], 3[\sigma^R, \sigma^f])$ where $\sigma^R = \sqrt{\text{diag}(\Sigma^R)}$, $\sigma^f = \sqrt{\text{diag}(\Sigma_f)}$. The optimizations provide insight about the agents 304-312. In particular, the optimizations may be calculated for each agent of the agents 304-312 and the host 302 and then computed the effective sample size of $n_t$ host-agent pairs to determine how many agents are statistically significant to the optimization. In this manner, a subset of the agents 304-312 may be determined for each time step.

Once the convex configuration is determined it may be used by the brake system 124, the path planning module 126, the notification system 128, and the sensor system 130 to alter the functioning of the host 302, the agents 304-312, and/or infrastructure, such as the sensor module 102. For example, the brake system 124 may transmit an instruction for the host 302 and/or the agents 304-312 to brake based on the convex configuration. The path planning module 126 may plan a path or adjust a path of the host 302 based on the convex configuration modeled by crowd. In another embodiment, the notification system 128 may notify the agents 304-312 based on the convex configuration, for example, the agents 304-312 may notified of the path of the host 302. In another embodiment, the sensor system 130 may adjust the manner and/or location that is sensed within the physical environment.

In this manner, Gaussian Processes may be used to model the joint interaction between the host 302 and the agents 304-312. The Gaussian Processes could model an infinite number of trajectories, however most trajectories are not likely. For example, it is not likely that an agent will zig-zag to a target. Instead, the trajectories are grouped into lanes and optimize over the function space and a Gaussian Processes is calculated for each agent. The Gaussian processes are multiplied by an objective function having a mean indicative of intent and a variance indicative of flexibility. Thus, the means become the basis set for a distribution of the Gaussian Processes. In this manner, the intent may be used to identify high value lanes. Further the constants may vary based on the flexibility.

The systems and methods described herein may be assessed based on datasets for simulations. In some embodiments, by partitioning a dataset into partial and full trajectories. A navigation test protocol may include identifying an agent. As one example the agent may be a pedestrian. The navigation protocol may also include extracting the start and end position of that agent. The navigation protocol may also include removing that agent from the observation dataset of the navigation algorithm. The navigation protocol further includes providing the start and end positions of the removed agent and the current and previous positions of the remaining agents to the navigation algorithm. Thus, there is at least one path through the crowd exists, for example, the path taken by that agent. Additionally, by providing the navigation algorithm with start and end points that are joined by a path through the crowd, the navigation algorithm naturally confronts high crowd densities (p(p)). Finally, this testing protocol provides a powerful performance benchmark: actual human performance on the exact same situation as encountered by the algorithm.

As discussed above, the dataset may be partitioned into partial and full trajectories. In one embodiment, the partial trajectory may be 10 meter long paths. For example, if agent 304 has a full trajectory of 30 meters long, there would be 3 partial trajectories. The partial trajectory experiments provide focused examination of an algorithm's ability to navigate through congestion in a safe and efficient manner. Full trajectory runs are the entire run of an agent. The full trajectory runs provide an additional level of information: they quantify how well the planner transitions between a variety of scenarios-strong interaction (head on avoidance, orthogonal crossing, following, being followed, etc.), light interaction (a nearby agent) and no interaction (straight line runs), all of which may occur in a single full trajectory run.

The simulations may be run to assess the Gaussian Processes based on a certain aspect of the environment. For example the simulation may be based on the category of agent, such as safety and path length data for humans as opposed to robotic agents and vice versa. As another example the simulation may be run to assess the Gaussian Processes based on the Freezing Robot Problem.

Figure 4:
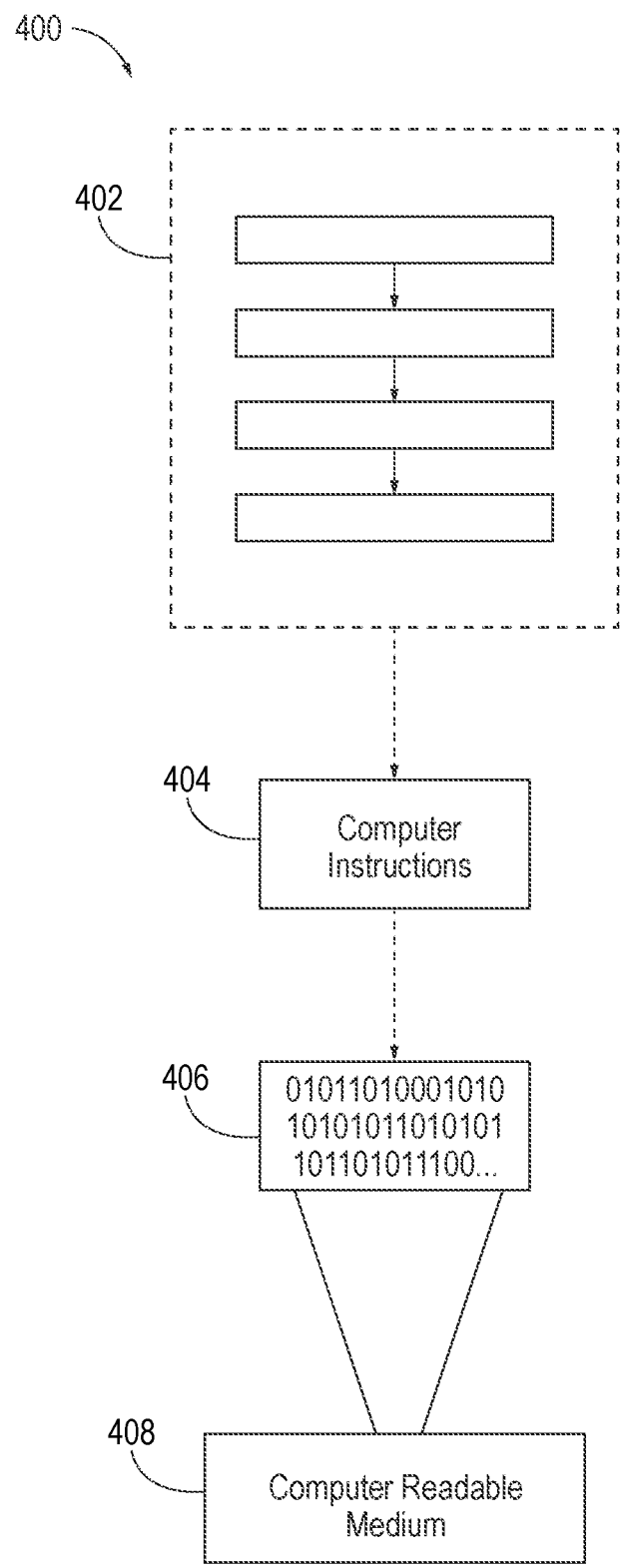
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the method 200 of FIG. 2. In another aspect, the processor-executable computer instructions 404 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
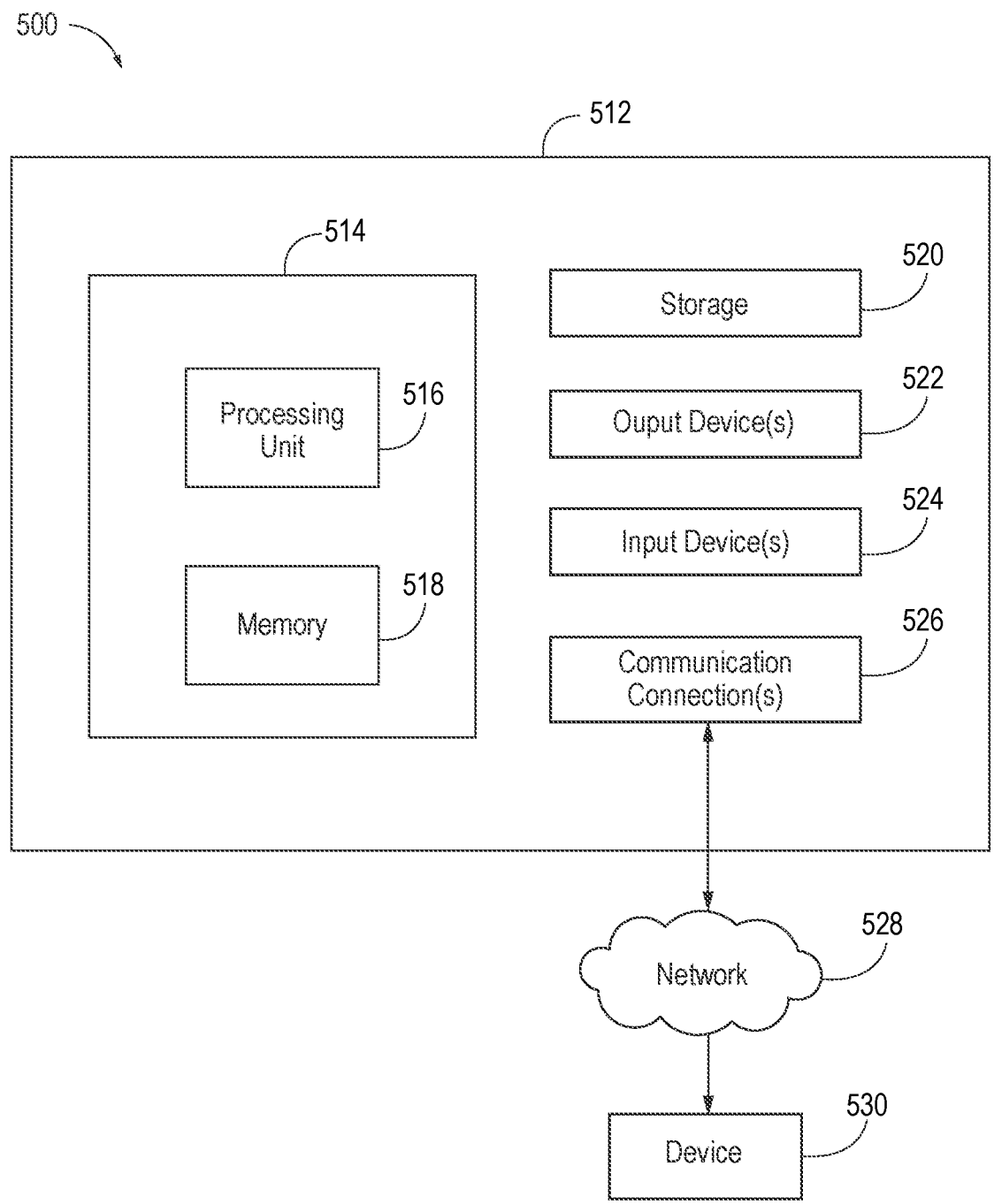
FIG. 5 is an illustration of an example computing environment where one or more of the provisions set forth herein are implemented, according to one aspect.

FIG. 5 and the following discussion provide a description of a suitable computing environment to implement aspects of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including an apparatus 512 configured to implement one aspect provided herein. In one configuration, the apparatus 512 includes at least one processing unit 516 and memory 518. Depending on the exact configuration and type of computing device, memory 518 may be volatile, such as RAM, non-volatile, such as ROM, flash memory, etc., or a combination of the two. This configuration is illustrated in FIG. 5 by dashed line 514.

In other aspects, the apparatus 512 includes additional features or functionality. For example, the apparatus 512 may include additional storage such as removable storage or non-removable storage, including, but not limited to, magnetic storage, optical storage, etc. Such additional storage is illustrated in FIG. 5 by storage 520. In one aspect, computer readable instructions to implement one aspect provided herein are in storage 520. Storage 520 may store other computer readable instructions to implement an operating system, an application program, etc. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 512. Any such computer storage media is part of the apparatus 512.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 512 includes input device(s) 524 such as keyboard, mouse, pen, voice input device, touch input device, infrared cameras, video input devices, or any other input device. Output device(s) 522 such as one or more displays, speakers, printers, or any other output device may be included with the apparatus 512. Input device(s) 524 and output device(s) 522 may be connected to the apparatus 512 via a wired connection, wireless connection, or any combination thereof. In one aspect, an input device or an output device from another computing device may be used as input device(s) 524 or output device(s) 522 for the apparatus 512. The apparatus 512 may include communication connection(s) 526 to facilitate communications with one or more other devices 530, such as through network 528, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for crowd navigation of a host vehicle, comprising:
   a processor configured to receive sensor data;
   a statistical module, implemented via the processor, configured to:
   identify a number of agents in a physical environment based on the sensor data;
   calculate a set of Gaussian processes, wherein the set of Gaussian processes includes a Gaussian Process for each agent of the number of agents; and
   determine an objective function based on an intent and a flexibility; and
   a model module, implemented via the processor, configured to:
   generate a model of the number of agents by applying the objective function to the set of Gaussian processes, wherein the model includes a convex configuration of the physical environment; and
   perform optimal shaping seeded with the intent and off-diagonal values to determine a subset of agents of the number of agents that are statistically significant based on a number of host and agent pairs, and wherein the convex configuration is based on the subset of agents.

2. The system of claim 1, wherein the sensor data is received from a sensor system of the host.

3. The system of claim 1, wherein the intent is based on a goal of the host, and wherein the flexibility is based on a willingness of the host to deviate from the goal.

4. The system of claim 1, wherein the intent is a mean of the objective function and the flexibility is a covariance of the objective function.

5. The system of claim 1, wherein the host is a robot, and wherein agents of the number of agents are humans.

6. A method for crowd navigation, comprising:
   identifying a number of agents in a physical environment based on sensor data from a host;
   calculating a set of Gaussian processes, wherein the set of Gaussian processes includes a Gaussian Process for each agent of the number of agents;
   determining an objective function based on an intent and a flexibility;
   generating a model of the number of agents by applying the objective function to the set of Gaussian processes, wherein the model includes a convex configuration of the physical environment; and
   performing optimal shaping seeded with the intent and off-diagonal values to determine a subset of agents of the number of agents that are statistically significant based on a number of host and agent pairs, and wherein the convex configuration is based on the subset of agents.

7. The method of claim 6, wherein the sensor data is received from a sensor system of the host.

8. The method of claim 6, wherein the intent is based on a goal of the host, and wherein the flexibility is based on a willingness of the host to deviate from the goal.

9. The method of claim 6, wherein the intent is a mean of the objective function and the flexibility is a covariance of the objective function.

10. The method of claim 6, wherein the host is a robot, and wherein agents of the number of agents are humans.

11. The method of claim 6, wherein the intent is based on collision avoidance of the host, and the flexibility is based on willingness of the host to deviate from a direct path.

12. A non-transitory computer readable storage medium storing instructions that when executed by a computer having a processor to perform a method for crowd navigation, the method comprising:
   identifying a number of agents in a physical environment based on sensor data received from a host;
   calculating a set of Gaussian processes, wherein the set of Gaussian processes includes a Gaussian Process for each agent of the number of agents;
   determining an objective function based on an intent and a flexibility;
   generating a model of the number of agents by applying the objective function to the set of Gaussian processes, wherein the model includes a convex configuration of the physical environment; and
   performing optimal shaping seeded with the intent and off-diagonal values to determine a subset of agents of the number of agents that are statistically significant based on a number of host and agent pairs, and wherein the convex configuration is based on the subset of agents.

13. The non-transitory computer readable storage medium of claim 12, wherein the sensor data is received from a sensor system of the host.

14. The non-transitory computer readable storage medium of claim 12, wherein the intent is based on a goal of the host, and wherein the flexibility is based on a willingness of the host to deviate from the goal.

15. The non-transitory computer readable storage medium of claim 12, wherein the intent is a mean of the objective function and the flexibility is a covariance of the objective function.

16. The non-transitory computer readable storage medium of claim 12, wherein the host is a robot, and wherein agents of the number of agents are humans.

17. The non-transitory computer readable storage medium of claim 12, wherein the intent is based on collision avoidance of the host, and the flexibility is based on willingness of the host to deviate from a direct path.

\* \* \* \* \*